(12) United States Patent
Takahashi et al.

(10) Patent No.: US 12,010,436 B2
(45) Date of Patent: Jun. 11, 2024

(54) IMAGING APPARATUS, METHOD FOR CONTROLLING IMAGING APPARATUS, AND STORAGE MEDIUM

(71) Applicant: CANON KABUSHIKI KAISHA, Tokyo (JP)

(72) Inventors: Ryosuke Takahashi, Kanagawa (JP); Akimitsu Yoshida, Tokyo (JP); Hiroaki Kuchiki, Chiba (JP); Kohei Furuya, Tokyo (JP); Hideki Kadoi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/853,347

(22) Filed: Jun. 29, 2022

(65) Prior Publication Data

US 2023/0007221 A1 Jan. 5, 2023

(30) Foreign Application Priority Data

Jun. 30, 2021 (JP) ................................ 2021-109335

(51) Int. Cl.
| | |
|---|---|
| *H04N 23/88* | (2023.01) |
| *H04N 5/77* | (2006.01) |
| *H04N 23/56* | (2023.01) |
| *H04N 23/63* | (2023.01) |
| *H04N 23/667* | (2023.01) |

(52) U.S. Cl.
CPC ............... *H04N 23/88* (2023.01); *H04N 5/77* (2013.01); *H04N 23/56* (2023.01); *H04N 23/631* (2023.01); *H04N 23/667* (2023.01)

(58) Field of Classification Search
CPC ...... H04N 23/88; H04N 23/667; H04N 23/56; H04N 23/631; H04N 5/77
USPC ......................................................... 348/296
See application file for complete search history.

(56) References Cited

U.S. PATENT DOCUMENTS

2017/0213494 A1* 7/2017 Carlsson .............. G09G 3/2007

FOREIGN PATENT DOCUMENTS

JP 2016095487 A 5/2016

* cited by examiner

*Primary Examiner* — Joel W Fosselman
(74) *Attorney, Agent, or Firm* — CANON U.S.A., INC. IP Division

(57) ABSTRACT

An apparatus includes an imaging unit, a setting unit configured to set automatic modes, an adjustment unit configured to adjust a white balance of a signal based on an automatic mode set by the setting unit, a recording control unit configured to record the adjusted signal into a recording unit, a display control unit configured to display the adjusted signal on a display unit, and an acquisition unit configured to acquire ambient light information, wherein the display control unit further adjusts a color balance of the displayed signal based on the set automatic mode and the acquired ambient light information.

19 Claims, 7 Drawing Sheets

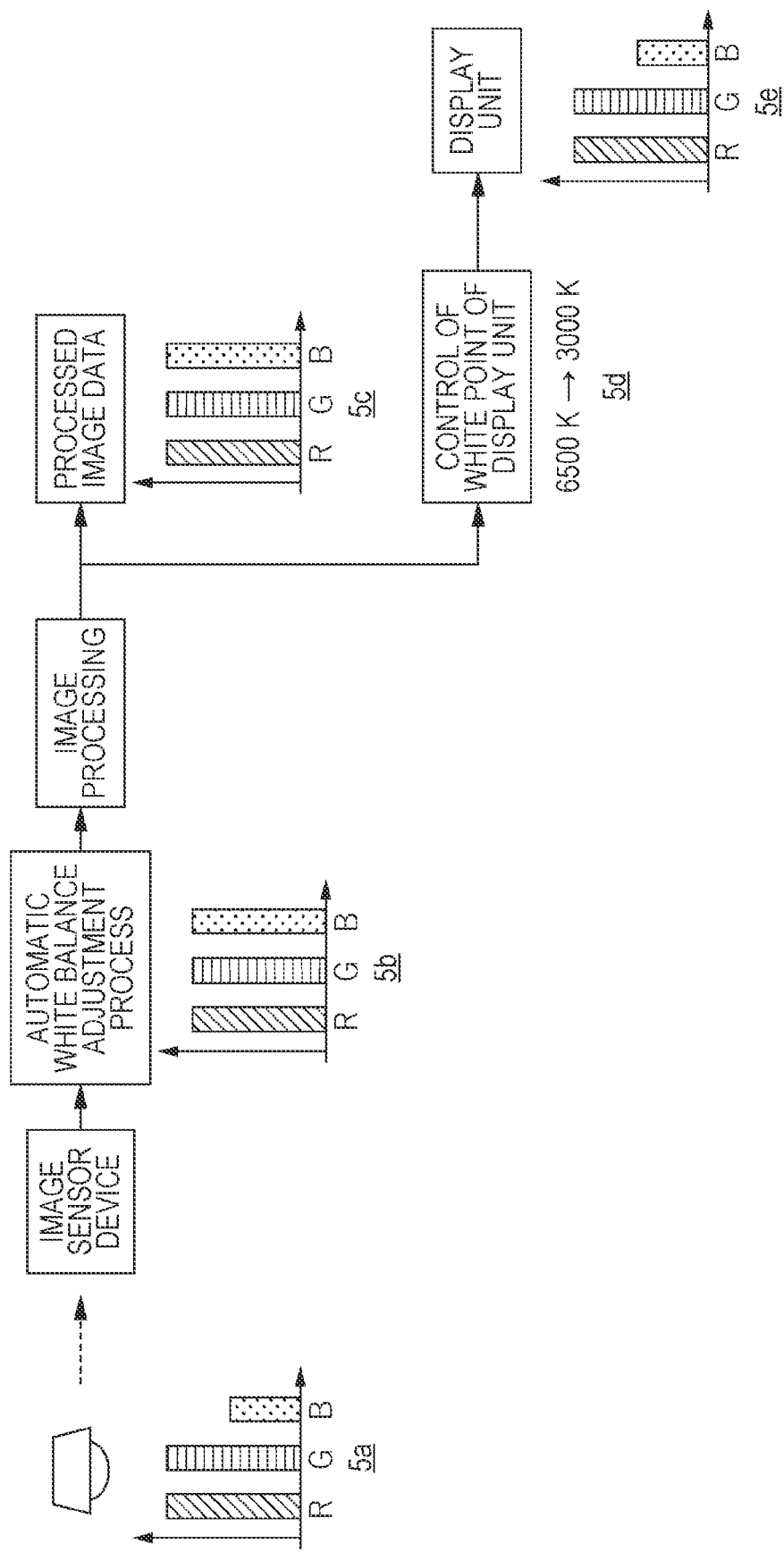

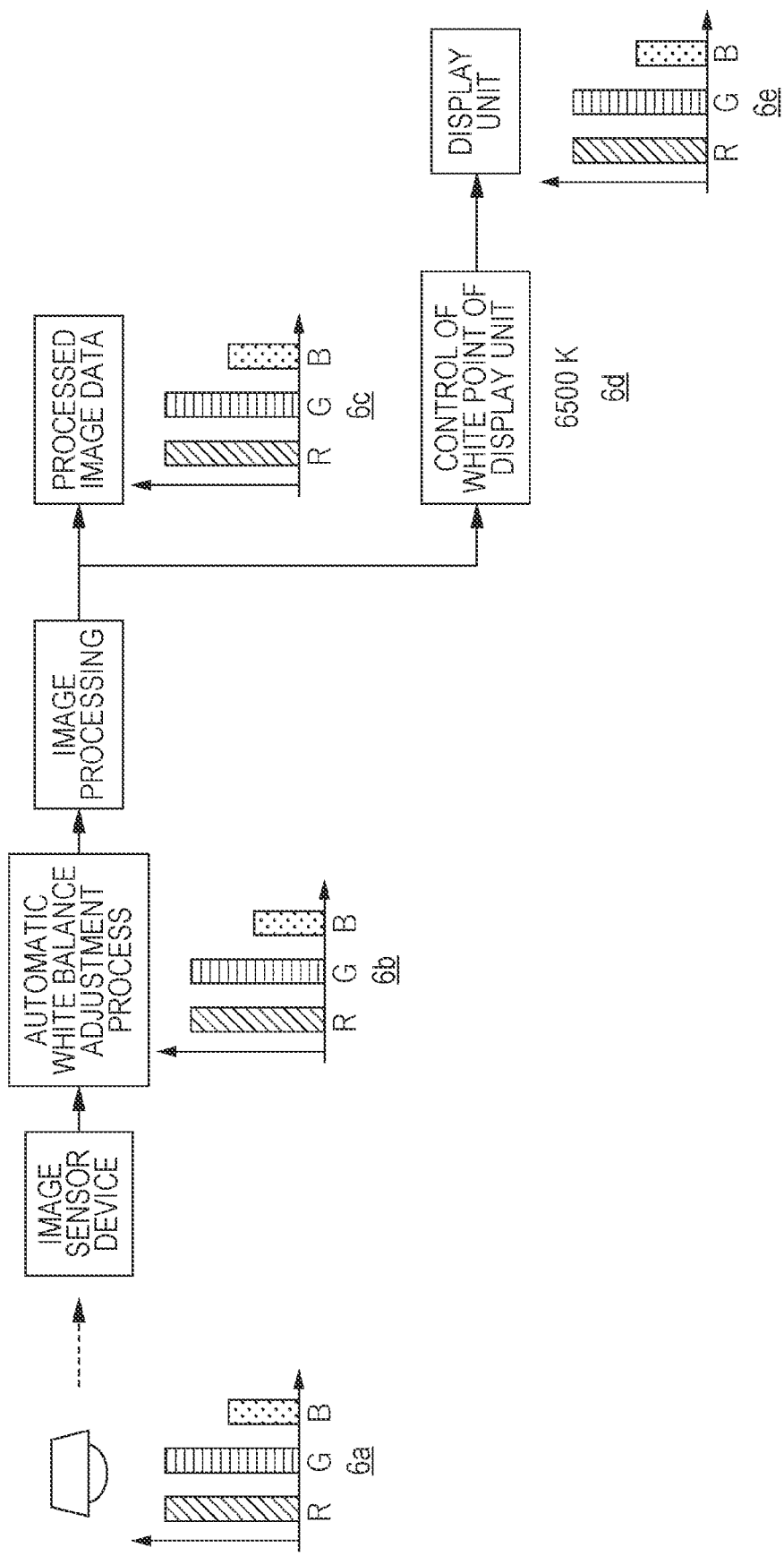

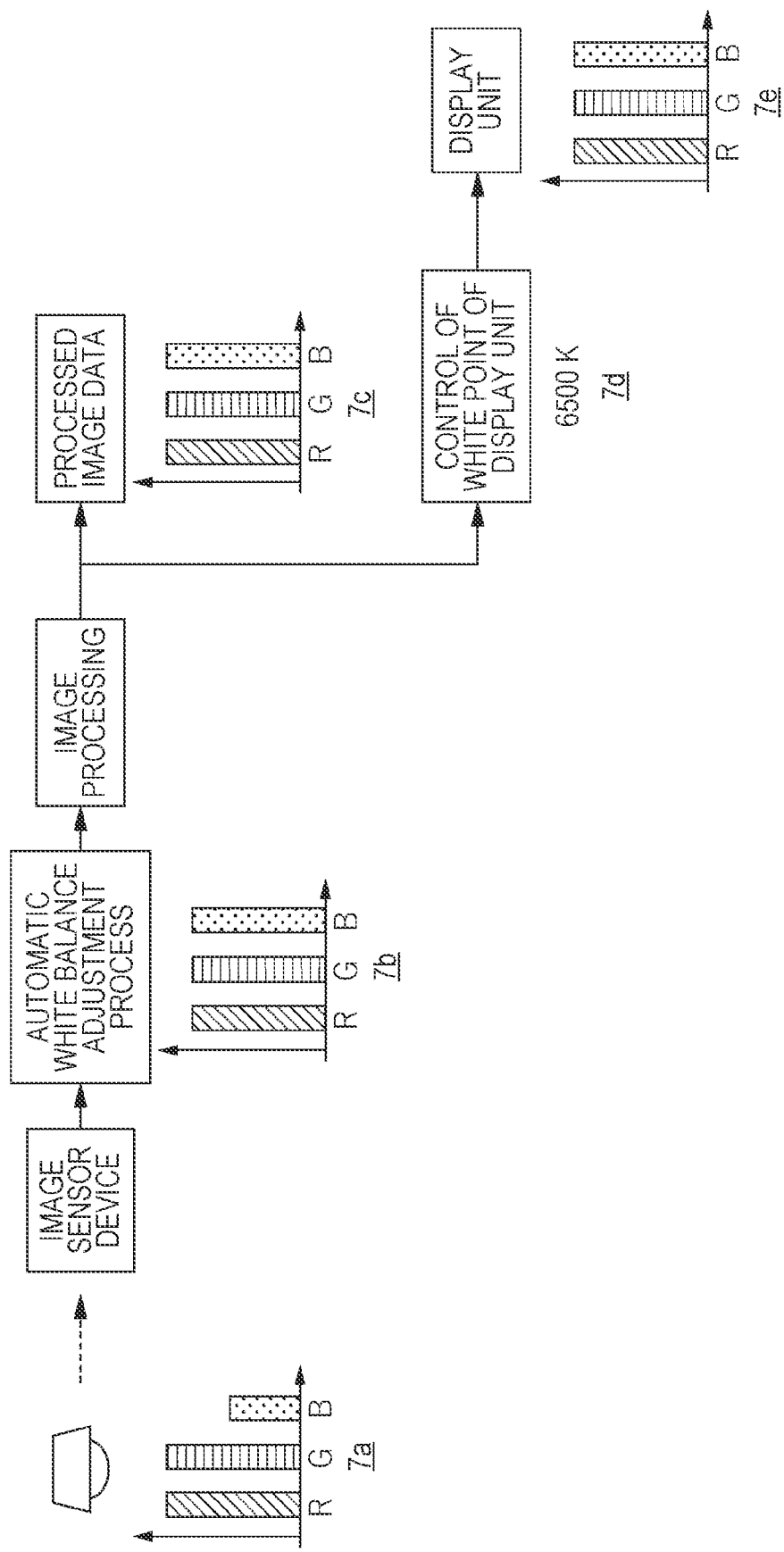

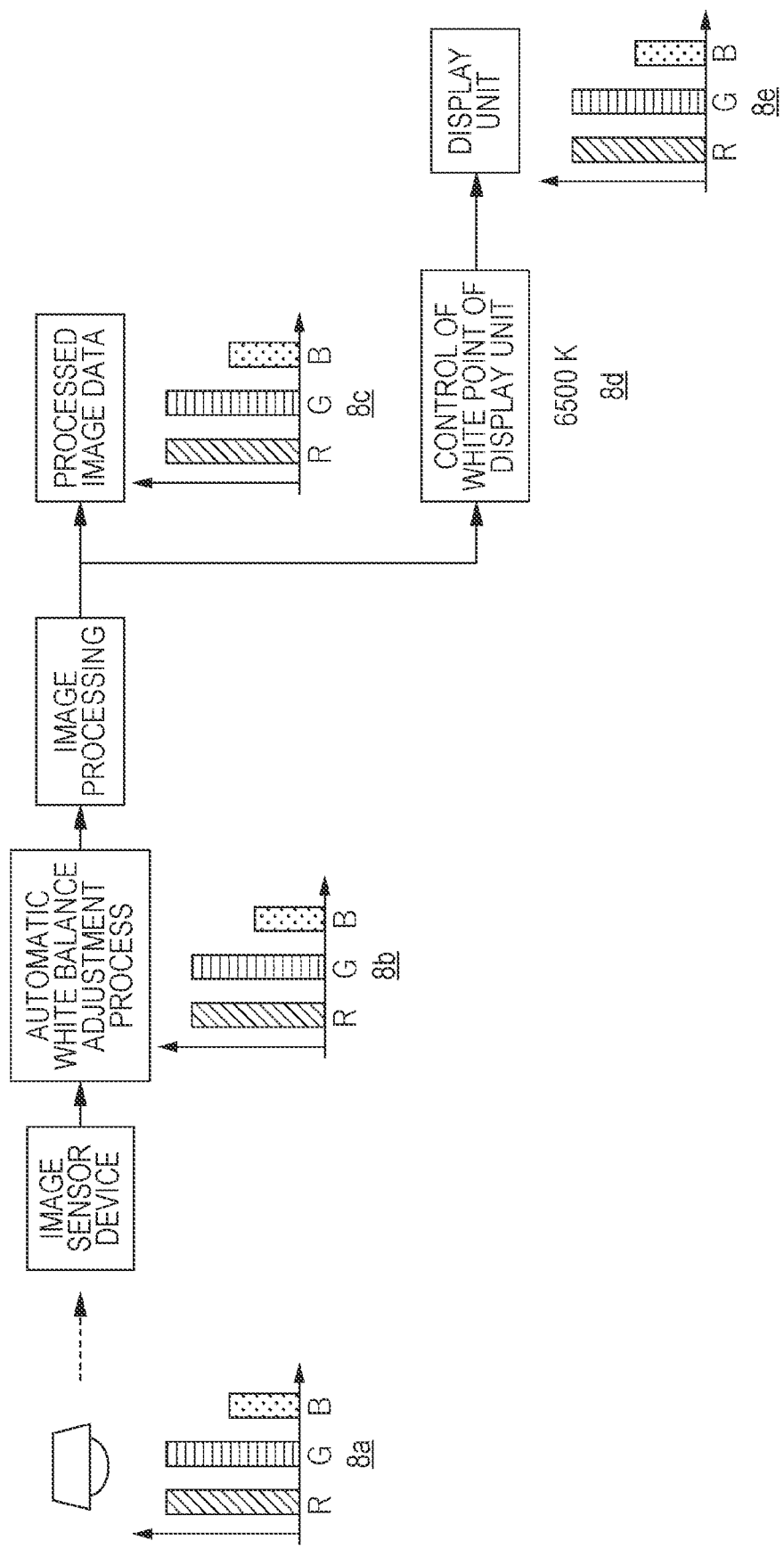

IMAGING APPARATUS, METHOD FOR CONTROLLING IMAGING APPARATUS, AND STORAGE MEDIUM

BACKGROUND

Technical Field

The aspect of the embodiments relates to a technique of controlling displaying in an imaging apparatus.

Description of the Related Art

An imaging apparatus using an image sensor device such as a digital camera, a digital video camera, or the like generally has an automatic white balance control function for automatically detecting an area appearing white from a captured image, calculating a white balance coefficient, and applying the calculated white balance coefficient to the entire image area. Some of imaging apparatuses available in markets have a plurality of automatic white balance modes arbitrarily selectable by a user. For example, the modes include a mode in which priority is given to adjusting a light source color to be white, a mode in which priority is given to adjusting a light source such as an incandescent lamp or the like with a reddish color to remain reddish thereby maintaining an original atmosphere of a place where an image is captured, thereby allowing a user to select a finish of an image.

In a case where there is a difference between a color temperature of ambient light and a color temperature of a display, which may occur, for example, when a user views a display with a high color temperature while the user is adapted to ambient illumination light with a low color temperature, the user may feel that the blueness of the display is too strong. In view of the above, Japanese Patent Laid-Open No. 2016-95487 discloses a method in which a white point of a display is adjusted to be similar to ambient light based on ambient light information such that a user is allowed to view the display with a preferable color tone.

However, in the technique disclosed in Japanese Patent Laid-Open No. 2016-95487, nothing is considered about the case where there are a plurality of white balance modes that may change the final color tone of an image. Therefore, in this technique, for example, in the mode in which a reddish color is maintained for a light source such as an incandescent lamp, there is a possibility that the redness is too strong against the intention of a user.

SUMMARY

In an aspect, the disclosure provides an apparatus including at least one processor, and a memory that stores a program which, when executed by the at least one processor, causes the at least processor to function as: an imaging unit, a setting unit configured to set automatic modes which are different in adjustment methods, an adjustment unit configured to adjust a white balance of a signal based on an automatic mode set by the setting unit, a recording control unit configured to record the adjusted signal into a recording unit, a display control unit configured to display the adjusted signal on a display unit, and an acquisition unit configured to acquire ambient light information, wherein the display control unit further adjusts a color balance of the displayed signal based on the set automatic mode and the acquired ambient light information.

Further features of the disclosure will become apparent from the following description of exemplary embodiments with reference to the attached drawings.

BRIEF DESCRIPTION OF THE DRAWINGS

FIG. 5 is a schematic diagram showing processing performed when the automatic white balance mode is AWB1 and the display mode is DISP1.

FIG. 6 is a schematic diagram showing processing performed when the automatic white balance mode is AWB2 and the display mode is DISP1.

FIG. 7 is a schematic diagram showing processing performed when the automatic white balance mode is AWB1 and the display mode is DISP2.

FIG. 8 is a schematic diagram showing processing performed when the automatic white balance mode is AWB2 and the display mode is DISP2.

DESCRIPTION OF THE EMBODIMENTS

Embodiments of the present disclosure are described in detail below with reference to accompanying drawings.

First Embodiment

Figure 1:
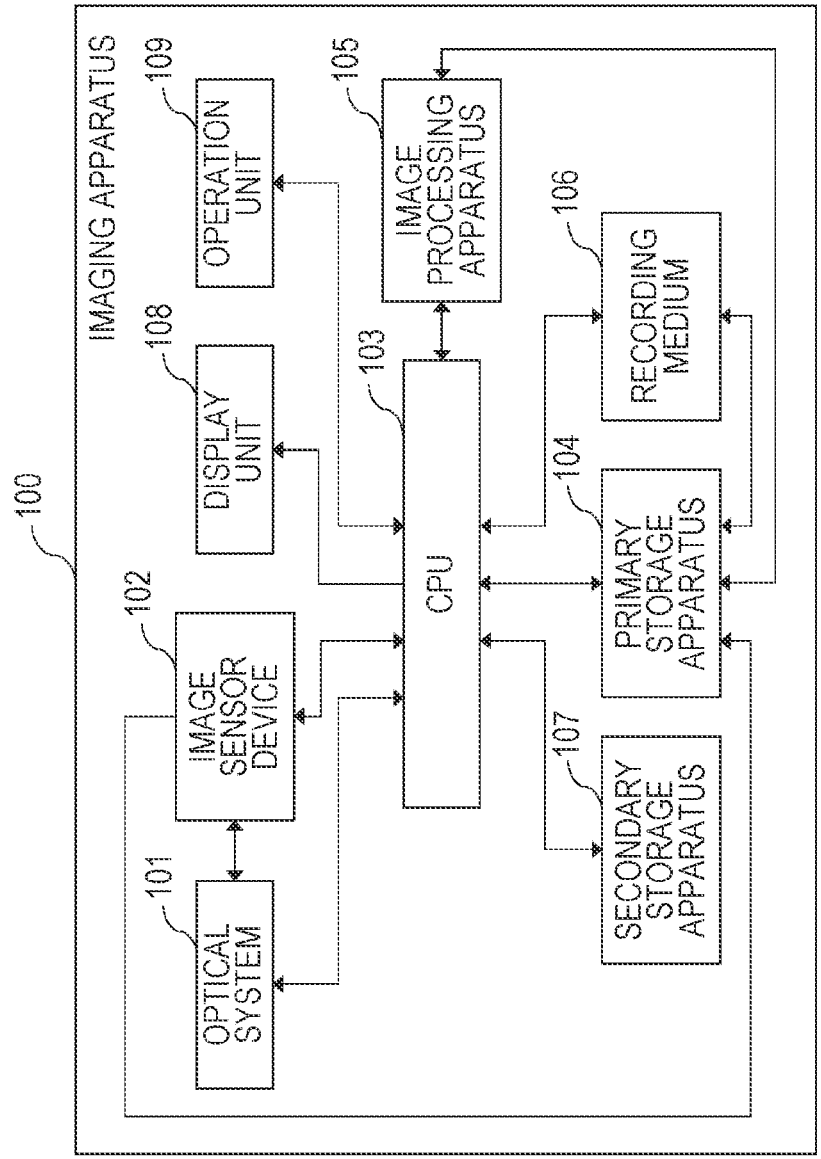
FIG. 1 is a block diagram illustrating a basic configuration of an imaging apparatus.

FIG. 1 is a block diagram illustrating a basic configuration of an imaging apparatus according to an embodiment of the present disclosure.

The imaging apparatus 100 may be a camera such as a digital camera, a digital video camera or the like, or may be an electronic device having a camera function such as a mobile phone with a camera, a computer with a camera, or the like. The optical system 101 is an imaging optical system including a lens group, a shutter, an aperture, and the like. The lens group includes a correction lens for correcting camera shake or the like, a focus lens, and the like.

The optical system 101 focuses subject light on an image sensor device 102 thereby forming an image thereon according to a control signal provided by a CPU 103. The image sensor device 102 is an image sensor device such as a CCD (Charge-Coupled Device) image sensor, a CMOS (Complementary Metal Oxide Semiconductor) image sensor, or the like, which converts an optical image formed through the optical system 101 into an image signal by a photoelectric conversion. In the present embodiment, a CMOS image sensor is employed as the image sensor device 102, and it is assumed that an optical image is converted into RGB image signal values.

The CPU 103 controls various units constituting the imaging apparatus 100 according to an input signal or the like by executing a program stored in advance in a memory to control an imaging operation, a displaying operation, a recording operation, and/or the like. A primary storage apparatus 104 is a volatile storage apparatus such as a RAM (Random Access Memory), which temporarily stores data, and which is used as a work memory by the CPU 103. Information stored in the primary storage apparatus 104 may be used by the image processing apparatus 105 or may be stored in the recording medium 106. A secondary storage apparatus 107 is a non-volatile storage apparatus such as an EEPROM (Electrically Erasable Programmable Read-Only Memory).

The recording medium 106, which is an example of a recording unit, stores captured image data or the like stored in the primary storage apparatus 104. The recording medium 106 may be a storage medium, such as a semiconductor memory card, that is removable from the imaging apparatus 100. The data stored in the recording medium 106 can be read from an external device such as a PC (Personal Computer) on which the recording medium 106 is loaded. That is, the imaging apparatus 100 has a mechanism for loading/unloading the recording medium 106 and a function of reading/writing data from/to the recording medium 106.

The secondary storage apparatus 107 is used by the CPU 103 and stores a program (firmware) for controlling the imaging apparatus 100 and various setting information. A display unit 108 is composed of a liquid crystal display, an organic EL display, or the like, and displays a viewfinder image at the time of capturing an image, a captured image, and a GUI (Graphical User Interface) image for interactive operation. It is allowed to change the setting of the white point of the display unit 108. Unless otherwise specified, the color temperature of the white point is set to 6500K, but another color temperature may be used.

An operation unit 109 includes an input device group for accepting an operation performed by a user and transmitting input information to the CPU 103. More specifically, the operation unit includes, for example, a button, a lever, a touch panel and/or the like. It is also possible to use an input device using voice, line of sight, or the like for operation.

The imaging apparatus 100 has a plurality of modes of image processing applied to a captured image by the image processing apparatus 105, and it is allowed to set one of these modes, via the operation unit 109, as an image capture mode. The image processing apparatus 105 performs various processes including image processing called development processing, color tone adjustment processing depending on the image capture mode, and/or the like. Note that at least a part of the functions of the image processing apparatus 105 may be realized by the CPU 103 by performing software processing. The image processing apparatus 105 also performs an automatic white balance adjustment process described later. There is no particular restriction on a manner of sharing roles among a plurality of pieces of hardware. One piece of hardware may function as a plurality of processing units, or a plurality pieces of hardware may cooperate to function as one processing unit.

Next, the automatic white balance adjustment process according to the present embodiment is described. The automatic white balance adjustment process according to the present embodiment is a process of calculating ambient light information from an image obtained by imaging, calculating a white balance adjustment value from the ambient light information, and applying the white balance adjustment value. The automatic white balance adjustment process according to the present embodiment has two control modes one of which is an automatic white balance mode 1 (hereinafter referred to as AWB1) and the other one of which is an automatic white balance mode 2 (hereinafter referred to as AWB2). These modes are different in the method of adjusting the white balance, and thus even when these modes are applied to the images captured for the same subject under the same ambient light, different adjustment results are obtained. AWB1 is a mode that aims to adjust the light source color to be white (by having same values for RGB colors). On the other hand, AWB2 aims to make setting such that a range to be made white by the automatic white balance adjustment is close to a color range to which human eyes are adaptable thereby reproducing a color as perceived by human eyes. When an image captured in the AWB2 mode is displayed on a display apparatus adjusted such that a white point corresponds to a color temperate of 6500K, the resultant displayed image has a color tone close to a color perceived by human eyes.

Figure 2:
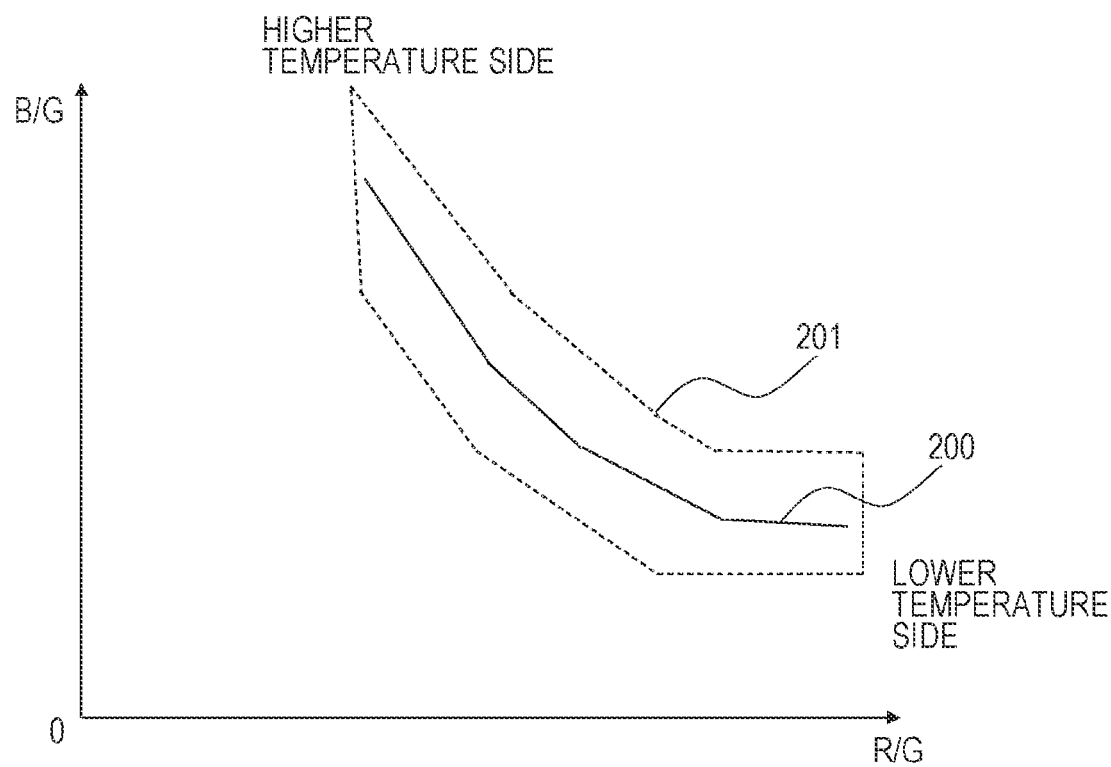
FIG. 2 is a diagram showing a white range.

Next, a method of acquiring ambient light information is described. In the present embodiment, the R/G value and B/G value of each pixel are acquired from an image signal value calculated by the image processing apparatus 105 from an image signal output from the image sensor device 102, and average values of those values for pixels located within a predetermined white range are calculated and the resultant values are employed as the ambient light information indicating ambient light around the imaging apparatus. The R value, the G value, and the B value of the image signal of the determined ambient light are respectively denoted as RL, GL, and BL. FIG. 2 is a diagram conceptually representing a white range. More specifically, FIG. 2 shows a color space in which an X-axis indicates the R/G value, a Y-axis indicates the B/G value, a solid line 200 indicates blackbody radiation axis, and the white range is given by a range surrounded by a broken line 201.

Figure 3:
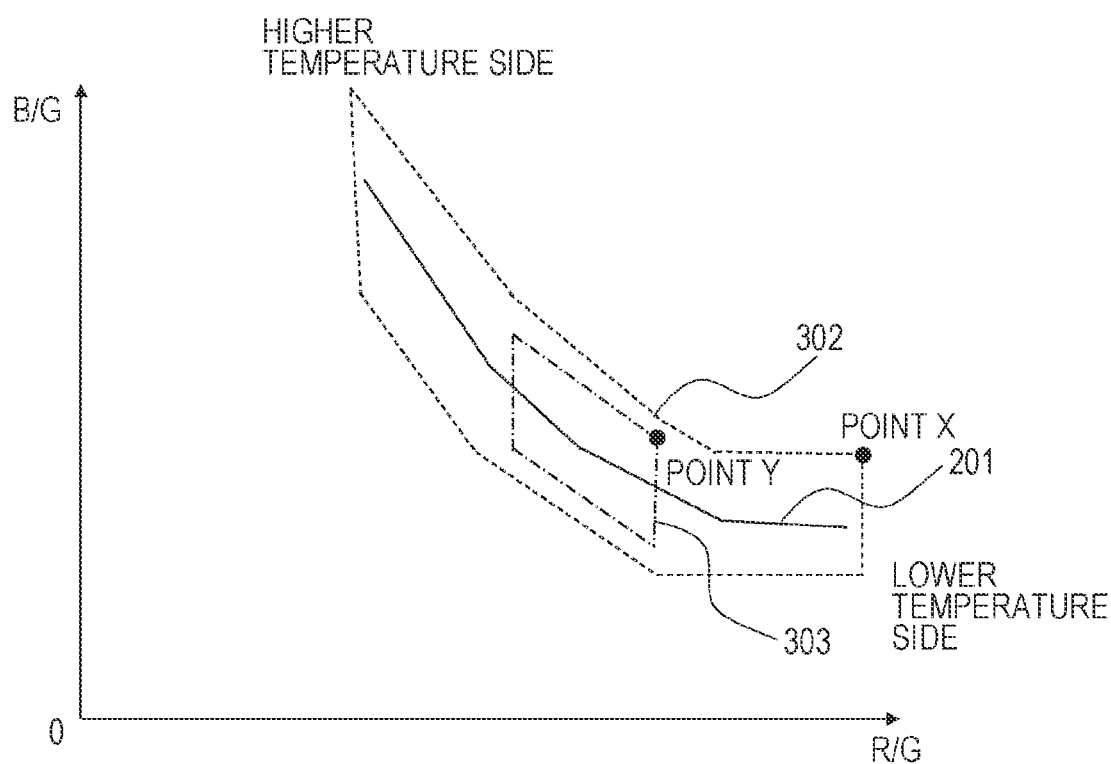
FIG. 3 is a diagram showing a dependence of a white tracking range on automatic white balance setting.

Next, a difference between AWB1 and AWB2 is described below with reference to FIG. 3. In FIG. 3, a region surrounded by a broken line 302 indicates a white tracking range of AWB1, and a region surrounded by a dotted line 303 indicates a white tracking range of AWB2. In the present embodiment, it is assumed that the white tracking range of AWB1 is the same as the white range. The white tracking range is a range in which the white balance adjustment is performed. A light source in the white tracking range is reproduced as white, while a light source outside the white tracking range is not reproduced as white. In a case where values (RL/GL, BL/GL) calculated from the image signal values RL, GL, and BL of the ambient light are out of the white tracking range, white tracking coefficients KW_R and KW_B for adjusting the image signal values RL and BL of the ambient light are calculated.

Next, a method of calculating the white tracking coefficients KW_R and KW_B are described with reference to FIG. 3.

Here it is assumed that the automatic white balance mode is AWB2, and the R/G value and B/G value calculated from the calculated image signal values RL, GL, and BL of ambient light are located at a point X (R_X, B_X) in FIG. 3. Since the point X is outside the white tracking range, a point Y which is closest, in the white tracking range, to the point X is calculated (wherein the R/G value and the B/G value of the point Y are respectively denoted as R_Y and B_Y). Then, the white tracking coefficients KW_R and KW_B are calculated according to following equations.

$$KW\_R = R\_Y/R\_X$$

$$KW\_B = B\_Y/B\_X$$

When the R/G value and B/G value of the image signal values RL, GL, and BL of the ambient light are within the white tracking range, KW_R and KW_B are equal to 1. The white tracking range of AWB2 is set to be closer to a color range to which human eyes are adaptable than to the white tracking range of AWB1 is, and thus AWB2 provides a color closer to a color perceived by the human.

After the ambient light information is acquired, the white balance adjustment values are calculated according to equations shown below wherein WR, WG, and WB are white balance adjustment values by which the R value, the G value, and the B value are respectively multiplied, and MAX [RL, GL, BL] indicates the maximum value of RL, GL, and BL.

$$WR=MAX[RL,GL,BL]/RL \times KW\_R$$

$$WG=MAX[RL,GL,BL]/GL$$

$$WB=MAX[RL,GL,BL]/BL \times KW\_B$$

In the present embodiment, as described above, ambient light information is acquired from a captured image. However, this is merely an example, and the ambient light information may be acquired in other ways. For example, in a case where a lighting system (a smart lighting system) has a capability of providing color information via a wireless communication, the color information acquired from the lighting system may be employed as the ambient light information. Another alternative method may be to acquire ambient light information from color information obtained from an image sensor device different from the image sensor device used to capture an image.

Next, display modes according to the present embodiment are described. The imaging apparatus 100 has two control modes for controlling the display unit 108, one of which is a display mode 1 (hereinafter, referred to as DISP1) and the other one of which is a display mode 2 (hereinafter, referred to as DISP2). DISP1 is a mode in which control is performed such that an image displayed on the display unit 108 has a color close to the color of the subject as seen by eyes of a user, regardless of the ambient light information or the automatic white balance setting. By controlling in the described manner, it is possible to achieve a reduction in artificiality felt by a user viewing the image displayed on the display unit 108. On the other hand, in DISP2, an image is displayed on the display unit 108 with a color tone depending on the camera setting thereby making it easy for the user to understand the dependence of the color tone on the camera setting.

In the imaging apparatus 100, it is allowed to select DISP1 or DISP2 for the live view at the time of capturing an image. However, when an image recorded on the recording medium 106 is reproduced and displayed, the display mode is limited to DISP2.

Figure 4:
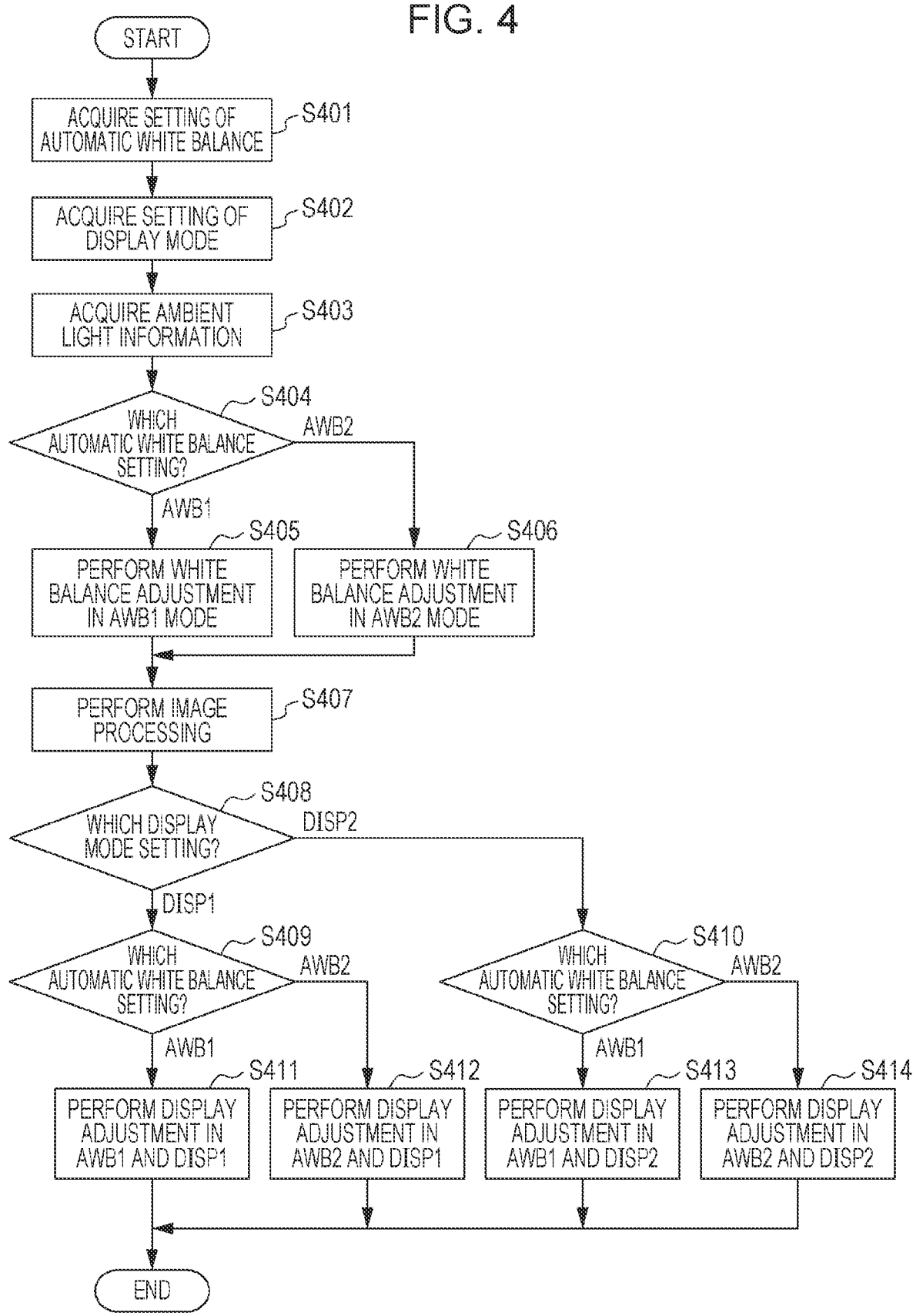
FIG. 4 is a flowchart of processing performed when an image is captured.

Next, a process performed by the imaging apparatus when an image is captured according to the present embodiment is described with reference to a flowchart shown in FIG. 4 and schematic diagrams illustrating imaging processes according to the automatic white balance setting and the display mode (FIGS. 5, 6, 7, and 8).

FIG. 5 is a schematic diagram illustrating an imaging process performed when the automatic white balance setting is AWB1 and the display mode is DISP1.

FIG. 6 is a schematic diagram illustrating an imaging process performed when the automatic white balance setting AWB2 and the display mode is DISP1.

FIG. 7 is a schematic diagram illustrating an imaging process performed when the automatic white balance setting is AWB1 and the display mode is DISP2.

FIG. 8 is a schematic diagram illustrating an imaging process performed when the automatic white balance setting is AWB2 and the display mode is DISP2.

Although there is no particular restriction on ambient light in the environment where an image is captured and on a subject to be captured, the following explanation is given, for simplicity, for a case where an image of a white subject is captured under ambient light with a color temperature of 3000K according to the present embodiment. The process shown in FIG. 4 is realized by the CPU 103 of the imaging apparatus by controlling each part of the imaging apparatus according to an input signal and various programs.

First, the imaging apparatus 100 acquires the automatic white balance setting (S401). The automatic white balance setting is a setting as to whether AWB1 or AWB2 is to be used as the control mode, which is specified by a user via the operation unit 109.

Next, the imaging apparatus 100 acquires the display mode setting (S402). The display mode setting is a setting as to whether DISP1 or DISP2 is to be used to control the display, which is specified by the user via the operation unit 109.

Next, the image processing apparatus 105 acquires ambient light information by the method described above (S403). In FIGS. 5, 6, 7, and 8, 5a, 6a, 7a, and 8a each conceptually show a characteristic of ambient light having a color temperature of 3000K according to the present embodiment, wherein the characteristic is represented by RGB color ratios (a color balance chart). Note that the RGB color ratios of the ambient light are independent of the automatic white balance setting and the display mode setting.

Next, the CPU 103 switches the process according to the acquired automatic white balance setting (S404). In a case where AWB1 is specified as the automatic white balance setting, the white balance adjustment is performed according to AWB1 as described above (S405). In a case where AWB2 is specified as the automatic white balance setting, the white balance adjustment is performed according to AWB2 as described above (S406). In FIGS. 5, 6, 7, and 8, 5b, 6b, 7b, and 8b each show RGB color ratios obtained after the automatic white balance adjustment is performed. In FIG. 5 and FIG. 7, AWB1 is specified as the automatic white balance setting, and thus the adjustment is performed such that R, G, and B are equal to each other. In contrast, in FIG. 6 and FIG. 8, AWB2 is specified as the automatic white balance setting, and thus the adjustment is performed such that the resultant color becomes similar to a color as seen by human eyes.

Next, the image processing apparatus 105 applies image processing such as gamma conversion and color conversion to the image signal obtained via the image processing in S405 or S406 (S407). In FIGS. 5, 6, 7, and 8, 5c, 6c, 7c, and 8c each conceptually show RGB color ratios of image data obtained after the image processing is performed.

Next, to perform the live view display process, the CPU 103 switches the display mode setting and the automatic white balance setting to the specified modes (S408, S409, and S410).

In a case where AWB1 is specified as the automatic white balance setting and DISP1 is specified as the display mode, the CPU 103 performs control such that the color temperature of the white point of the display unit 108 is close to the color temperature of the ambient light (S411). In the present embodiment, it is assumed that the color temperature of the ambient light is 3000K, and thus the CPU 103 controls the display unit 108 such that the color temperature of the white point of the display unit 108 becomes equal to 3000K. By performing control in the above-described manner, it is possible to make the color of the white subject displayed on the display unit 108 close to the color of the white subject seen by human eyes, as shown by 5e in FIG. 5.

In a case where AWB2 is specified as the automatic white balance setting and DISP1 is specified as the display mode, the CPU 103 performs control such that the color temperature of the white point of the display unit 108 is equal to 6500K. This is because when the image data is processed in the AWB2 mode according to the present embodiment and the resultant image data is displayed on a display apparatus with a color temperature of 6500K, the displayed image has a color close to the actual color of the subject seen by human eyes (S412). By performing control in the above-described manner, it is possible to make the color of the white subject displayed on the display unit 108 close to the color of the white subject seen by human eyes, as shown by 6e in FIG. 6.

In a case where the display mode is DISP2, the CPU 103 performs control such that the image displayed on the display unit 108 while maintaining the color temperature of the white point of the display unit 108 at a standard value, that is, 6500K (S413, S414).

In the present embodiment, in the case where the automatic white balance setting is AWB1, when the human eyes are adapted to ambient light of 3000K, the subject displayed on the display unit 108 looks more bluish than the subject looks when it is directly seen by the human eyes. However, the control is performed in the above-described manner to ensure that the user can perceive the difference when the automatic white balance setting is switched between AWB1 and AWB2.

The processing according to the present embodiment has been described above. In the present embodiment, as described above, the color of the display unit is adjusted according to the white balance adjustment method. This makes it possible to reduce the artificiality felt by a user viewing a live view image.

OTHER EMBODIMENTS

The present disclosure may also be realized by executing the following processing. That is, software (a program) that realizes the functions of the above-described embodiment is supplied to a system or a device via a network or various storage media, and a computer (or a CPU, an MPU, etc.) of the system or the device reads the program and executes it.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-109335, filed Jun. 30, 2021, which is hereby incorporated by reference herein in its entirety.

What is claimed is:

1. An apparatus, comprising:
at least one processor; and a memory that stores a program which, when executed by the at least one processor, causes the at least processor to function as:
an imaging unit configured to obtain a signal;
a first setting unit configured to set an automatic white balance mode from among a plurality of automatic white balance modes which are different in adjustment methods;
an adjustment unit configured to adjust a white balance of the signal based on the automatic white balance mode set by the first setting unit;
a recording control unit configured to record the adjusted signal into a recording unit;
a display control unit configured to display a signal based on the adjusted signal on a display unit;
a second setting unit configured to set a display mode from among a plurality of display modes which are different in control methods; and
an acquisition unit configured to acquire ambient light information,
wherein the display control unit further adjusts a color balance of the adjusted signal based on the set automatic white balance mode, the set display mode, and the acquired ambient light information, and displays the adjusted signal using the adjusted color balance on the display unit.

2. The apparatus according to claim 1, wherein the display control unit adjusts the color balance by changing a white point of the display unit.

3. The apparatus according to claim 1, wherein a setting as to whether or not to perform the adjustment of the color balance is made according to an operation performed by a user.

4. The apparatus according to claim 1, wherein the automatic modes include a mode in which the adjustment is performed with an aim to adjust a light source to be white and a mode in which the adjustment is performed with an aim to adjust the light source to have a color similar to a color perceived by a user.

5. The apparatus according to claim 1, wherein the display control unit adjusts the color balance of an image displayed as a live view image.

6. The apparatus according to claim 1, wherein the plurality of display modes includes a mode for controlling a display regardless of the ambient light information or the set automatic white balance mode.

7. The apparatus according to claim 1, wherein the plurality of display modes includes a mode for performing control to display a signal a color adjustment of which has been performed based according to a setting of a camera.

8. A method for an apparatus, comprising:
obtaining a signal from imaging;

setting an automatic white balance mode from among a plurality of automatic white balance modes which are different in adjustment methods;

adjusting a white balance of the signal based on the automatic white balance mode set in the setting;

recording the adjusted signal into a recording unit;

displaying a signal based on the adjusted signal on a display unit;

setting a display mode from among a plurality of display modes which are different in control methods; and acquiring ambient light information, wherein the displaying further includes adjusting a color balance of the adjusted signal based on the set automatic white balance mode, the set display mode, and the acquired ambient light information, and displaying the adjusted signal using the adjusted color balance on the display unit.

9. The method according to claim 8, wherein the adjusting adjusts the color balance by changing a white point of the display unit.

10. The method according to claim 8, wherein a setting as to whether or not to perform the adjustment of the color balance is made according to an operation performed by a user.

11. The method according to claim 8, wherein the automatic modes include a mode in which the adjustment is performed with an aim to adjust a light source to be white and a mode in which the adjustment is performed with an aim to adjust the light source to have a color similar to a color perceived by a user.

12. The method according to claim 8, wherein the adjusting adjusts the color balance of an image displayed as a live view image.

13. The method according to claim 8, wherein the plurality of display modes includes one of a mode for controlling a display regardless of the ambient light information or the set automatic white balance mode and a mode for performing control to display a signal a color adjustment of which has been performed based according to a setting of a camera.

14. A non-transitory computer-readable storage medium storing instructions that, when executed by a computer, cause the computer to perform a method, the method comprising:

obtaining a signal from imaging;

setting an automatic white balance mode from among a plurality of automatic white balance modes which are different in adjustment methods;

adjusting a white balance of the signal based on the automatic white balance mode set in the setting;

recording the adjusted signal into a recording unit;

displaying a signal based on the adjusted signal on a display unit;

setting a display mode from among a plurality of display modes which are different in control methods; and acquiring ambient light information, wherein the displaying further includes adjusting a color balance of the adjusted signal based on the set automatic white balance mode, the set display mode, and the acquired ambient light information, and displaying the adjusted signal using the adjusted color balance on the display unit.

15. The non-transitory computer-readable storage medium according to claim 14, wherein the adjusting adjusts the color balance by changing a white point of the display unit.

16. The non-transitory computer-readable storage medium according to claim 14, wherein a setting as to whether or not to perform the adjustment of the color balance is made according to an operation performed by a user.

17. The non-transitory computer-readable storage medium according to claim 14, wherein the automatic modes include a mode in which the adjustment is performed with an aim to adjust a light source to be white and a mode in which the adjustment is performed with an aim to adjust the light source to have a color similar to a color perceived by a user.

18. The non-transitory computer-readable storage medium according to claim 14, wherein the adjusting adjusts the color balance of an image displayed as a live view image.

19. The non-transitory computer-readable storage medium according to claim 14, wherein the plurality of display modes includes one of a mode for controlling a display regardless of the ambient light information or the set automatic white balance mode and a mode for performing control to display a signal a color adjustment of which has been performed based according to a setting of a camera.

* * * * *